US006484021B1

(12) United States Patent
Hereford et al.

(10) Patent No.: US 6,484,021 B1
(45) Date of Patent: *Nov. 19, 2002

(54) AVALANCHE VICTIM LOCATING TRANSCEIVING APPARATUS

(75) Inventors: John W. Hereford, 2204 Pine St., Boulder, CO (US) 80302; Michael X. Bond, Boulder, CO (US)

(73) Assignee: John W. Hereford, Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/713,124

(22) Filed: Nov. 15, 2000

Related U.S. Application Data

(63) Continuation of application No. 09/008,880, filed on Jan. 20, 1998, now Pat. No. 6,167,249.
(60) Provisional application No. 60/035,675, filed on Jan. 22, 1997.

(51) Int. Cl.$^7$ .............................................. H04M 11/00
(52) U.S. Cl. ........................ 455/404; 340/573; 455/90
(58) Field of Search .............................. 455/404, 575, 455/500, 90, 88, 573, 456, 457, 66, 67.1, 68, 70; 343/719, 720; 342/22, 28, 146; 340/573

(56) References Cited

U.S. PATENT DOCUMENTS

| 3,777,267 | A | | 12/1973 | Van Der Floe et al. ....... 325/18 |
| 3,806,936 | A | | 4/1974 | Koster .................. 343/113 PT |
| 4,045,799 | A | | 8/1977 | Dapiran ....................... 343/113 |
| 4,121,216 | A | * | 10/1978 | Bunch et al. ................ 343/113 |
| 4,219,821 | A | * | 8/1980 | Selim .......................... 343/113 |

(List continued on next page.)

FOREIGN PATENT DOCUMENTS

| EP | 733916 | | 12/1995 |
| EP | 733916 A2 | * | 9/1996 |

OTHER PUBLICATIONS

English translation of EP 0 733 916 A2, Sep. 25, 1996, Europe.

English translation of *Mit nur einem Empfanger*, 1983, pp. 64–66.

A. Richtscheid, *Ein Suchgerat zum schnellen Orten von Lawinenverschutteten*, Internationale Elektronische Rundschau, 1975, pp. 13–16.

*Emetter–Recepteur de Secours Contre Les Avalanches*, 1994, pp. 29–34.

*Mit nur einem Empfanger*, 1983, pp. 64–66.

Primary Examiner—Dwayne Bost
Assistant Examiner—Joy K. Contee
(74) Attorney, Agent, or Firm—Holme Roberts & Owen LLP; Christopher J. Kulish, Esq.

(57) ABSTRACT

A rescue transceiver apparatus for transmitting a signal to and receiving a signal from another rescue transceiver apparatus is provided. The apparatus comprises a housing and a radio signal transmitter for the transmission of a radio signal in a transmitting mode with a first predetermined frequency with the radio signal transmitter being mounted within the housing. A receiver is provided for selectively receiving the first predetermined frequency from the radio signal transmitter in a receiving mode. The receiver comprises a first antenna mounted completely within the housing, a second antenna mounted completely within the housing with the second antenna being disposed substantially perpendicular to the first antenna, and a virtual third antenna mounted completely within the housing with the virtual third antenna being derived from phase information generated by the first antenna and the second antenna. The first antenna, the second antenna, and the third virtual third antenna provide three-dimensional vector analysis by the receiver of the predetermined frequency received from the radio transmitter. The apparatus further comprises a microcontroller for controlling the radio signal transmitter and the receiver.

20 Claims, 2 Drawing Sheets

U.S. PATENT DOCUMENTS

| | | | |
|---|---|---|---|
| 4,314,240 A | 2/1982 | Schniig | 340/573 |
| RE31,375 E | 9/1983 | Sellers et al. | 343/22 |
| 4,754,281 A | 6/1988 | Donath | 342/417 |
| 4,850,031 A * | 7/1989 | Allsop et al. | 455/49 |
| 5,298,883 A * | 3/1994 | Pilney et al. | 340/573.2 |
| 5,414,432 A | 5/1995 | Penny, Jr. et al. | 342/357 |
| 5,519,403 A | 5/1996 | Bickley et al. | 342/352 |
| 5,525,967 A * | 6/1996 | Azizi et al. | 340/573.2 |
| 5,603,094 A * | 2/1997 | Greear, Jr. | 455/66 |
| 5,790,032 A | 8/1998 | Schmidt | 340/573 |
| 5,847,679 A | 12/1998 | Yee et al. | 342/357 |
| 5,914,675 A | 6/1999 | Tognazzini | 340/989 |
| 5,955,982 A | 9/1999 | Moulin | 342/22 |

\* cited by examiner

AVALANCHE VICTIM LOCATING TRANSCEIVING APPARATUS

This is a continuation of U.S. application Ser. No. 09/008,880, filed Jan. 20, 1998, now U.S. Pat. No. 6,167,249.

The present application is a continuation of the pending provisional patent application entitled "Avalanche Victim Locating Apparatus", Ser. No. 60/035,675, filed on Jan. 22, 1997.

BACKGROUND OF THE INVENTION

1. Field of the Invention

This invention relates generally to an avalanche victim locating transceiving apparatus for locating buried victims by a searching survivor and, more particularly, it relates to an avalanche victim locating transceiving apparatus for locating buried victims by a searching survivor which provides both directional and distance readouts to the searching survivor.

2. Description of the Prior Art

Avalanches pose an extremely grave danger for skiers, climbers, military personnel, and others in mountain regions during winter and spring. Death or serious injury can result when a person is buried in snow unless rescue is quickly effected. Rescue is difficult because a person buried in an avalanche cannot be seen, may be moved by the avalanche away from the last visible position, and cannot easily be located. Suffocation, hypothermia, and cardiac arrest, coupled with shock, become more likely the longer the victim is buried. The amount of time spent in locating a victim is an important factor in the probability that the victim will not survive or will be severely injured.

In an attempt to address these problems, electronic locating systems are increasingly being used, for example, by the ski industry, snowmobilers, and the military. With one type of system presently in use, each member of a group exposed to avalanche danger is supplied with a continuously energized, battery powered radio transceiver unit operating continuously in a transmitting mode. With these known systems, continuous transmission is relied upon to assure that transmission occurs when a victim is buried. If part of the group is buried in an avalanche, the remaining members switch their units to a receiving mode and attempt to locate buried individuals by variations in received signal strength.

This type of system has serious drawbacks. Since the older units had to be easily portable and battery weight was limited, the use of high power alarm signals was impractical. These conventional units merely provided a non-directional signal. In order to find a buried victim, it is necessary to move about, preferably in a grid pattern, while attempting to detect increases and decreases in signal strength. This can be difficult and time consuming, particularly in the unfavorable terrain common to avalanche sites. The difficulty is compounded by the fact that survivors are often confused or in shock. In addition, if multiple victims are buried, the region of maximum signal strength may not coincide with the location of a victim. In the prior art, power consumption and the necessity for continuous transmission prevent the use of an audible alarm that would be useful when a survivor is in relatively close proximity to a victim.

In an effort to overcome the shortcomings of the prior art, the Allsop et al, U.S. Pat. No. 4,850,031, describes an avalanche victim locating system having a trigger provided by light sensitive elements on the user, or by a signal transmitted from a survivor. A microprocessor control synchronizes VHF information signal transmission and burst microwave transmission from a victim as well as received signal processing by a survivor. A directional multiple antenna array is switched to provide directional signals displayed to the survivor and is extended when the apparatus is opened.

While the avalanche victim locating device of the Allsop et al patent overcomes many of the problems associated with the prior art, the device of the Allsop et al patent creates additional difficulties which must be addressed. First, with the Allsop et al patent's device, it is not possible to determine exactly the distance between the buried victim and the searching survivor. Second, the device of the Allsop et al patent relies on sensors to activate the unit to a transmitting mode. If the sensors are defective or become faulty, there is a chance that the transmitting mode will never be activated. Third, even if the Allsop et al patent's device can be remotely activated by a rescuer, the rescuer must have the same device in order to activate the transmitting mode. If rescuers are using a different type of avalanche rescue device, they will not be able to activate the transmitting mode and the buried victim will not be able to be located. Finally, the device of the Allsop et al patent relies on microwave technology which requires the size of the rescue equipment to be quite large.

Accordingly, there exists a need for an avalanche victim locating transceiving apparatus for locating buried victims by a searching survivor which provides both directional and distance readouts to the searching survivor. Additionally, a need exists for an avalanche victim locating transceiving apparatus for locating buried victims by a searching survivor which provides improved rescue times and decreases the amount of time the buried victim remains buried. Furthermore, there exists a need for an avalanche victim locating transceiving apparatus for locating buried victims by a searching survivor which provides dual visual/audible functions for directional and versatility and backup redundancy for user confidence in all weather conditions. Further yet a need exists for avalanche victim locating transceiving apparatus for locating buried victims by a searching survivor which provides an efficient, tuned transmitter which automatically switches from a search mode to a transmit mode in case of rescuers being caught in a secondary avalanche while trying to locate the buried victims.

SUMMARY OF THE INVENTION

The present invention is a rescue transceiver apparatus for transmitting a signal to and receiving a signal from another rescue transceiver apparatus. The apparatus of the present invention comprises a portable housing and a radio signal transmitter mounted within the housing for the transmission of a radio signal in a transmitting mode with a first predetermined frequency. A receiver is provided for selectively receiving the first predetermined frequency from the radio signal transmitter in a receiving mode. The receiver comprises a first antenna mounted completely within the housing, a second antenna mounted completely-within the housing with the second antenna being disposed substantially perpendicular to the first antenna, and a virtual third antenna mounted completely within the housing with the third antenna being derived from phase information generated by the first antenna and the second antenna. The first antenna, the second antenna, and the third virtual antenna provide three-dimensional vector analysis by the receiver of the predetermined frequency received from the radio transmitter.

In an embodiment of the present invention, the apparatus further comprises a microcontroller for controlling the radio signal transmitter and the receiver.

In another embodiment of the present invention, the first antenna and the second antenna are selectively shielded and isolated. Preferably, the apparatus further comprises a tuned amplifier connected to the third antenna. Furthermore, preferably, the tuned amplifier has a predetermined frequency equal to the first predetermined frequency.

In still another embodiment of the present invention, the apparatus comprises a superheterodyne receiver with the receiver receiving the first predetermined frequency, mixing the first predetermined frequency with a local oscillator frequency, and generating an Intermediate Frequency for amplification, filtering, and generation of a logarithmic signal strength.

In yet another embodiment of the present invention, the apparatus comprises an activatable transmit/receive mechanism mounted to the housing for selectively converting between the transmit mode and the receiving mode. Preferably, upon activation of the transmit/receive mechanism from the transmit mode to the receiving mode, the apparatus automatically converts from the receiving mode to the transmit mode after a predetermined time period.

In still yet another embodiment of the present invention, the apparatus comprises indication means on the housing for displaying information. Preferably, the indication means includes a dual digit, distance light emitting diode display. Furthermore, preferably, the indication means includes a distance display displaying the distance between an apparatus in the transmit mode and an apparatus in the receiving mode. Additionally, preferably, the indication means includes a battery power display displaying the remaining battery power percentage of the apparatus.

In a further another embodiment of the present invention, the apparatus comprises a plurality of indicators for determining direction between an apparatus in the transmit mode and an apparatus in the receiving mode. Preferably, the indicators are light emitting diodes arranged in an arc across the housing.

In another embodiment of the present invention, the apparatus comprises means for muting sounds emitting from the apparatus. Additionally, the apparatus comprises strapping means for releasably securing the housing to a person.

The present invention further includes a device for transmitting a signal to and receiving a signal from another device. The device comprises a housing and a radio signal transmitter for the transmission of a radio signal in a transmitting mode with a first predetermined frequency, the radio signal transmitter being mounted within the housing. A receiver is provided for selectively receiving the first predetermined frequency from the radio signal transmitter in a receiving mode and means for selectively masking multiple radio signal transmissions are provided thereby allowing the receiver to selectively received one radio signal transmission.

The present invention also further includes a rescue transceiver apparatus for transmitting a signal to and receiving a signal from another rescue transceiver apparatus. The apparatus comprises a housing and a radio signal transmitter for the transmission of a radio signal in a transmitting mode with a first predetermined frequency with the radio signal transmitter being mounted within the housing. A receiver is provided for selectively receiving the first predetermined frequency from the radio signal transmitter in a receiving mode and means are provided for changing from the receiving mode to the transmitting mode after a predetermined time period.

DETAILED DESCRIPTION OF THE PREFERRED EMBODIMENTS

Figure 1:
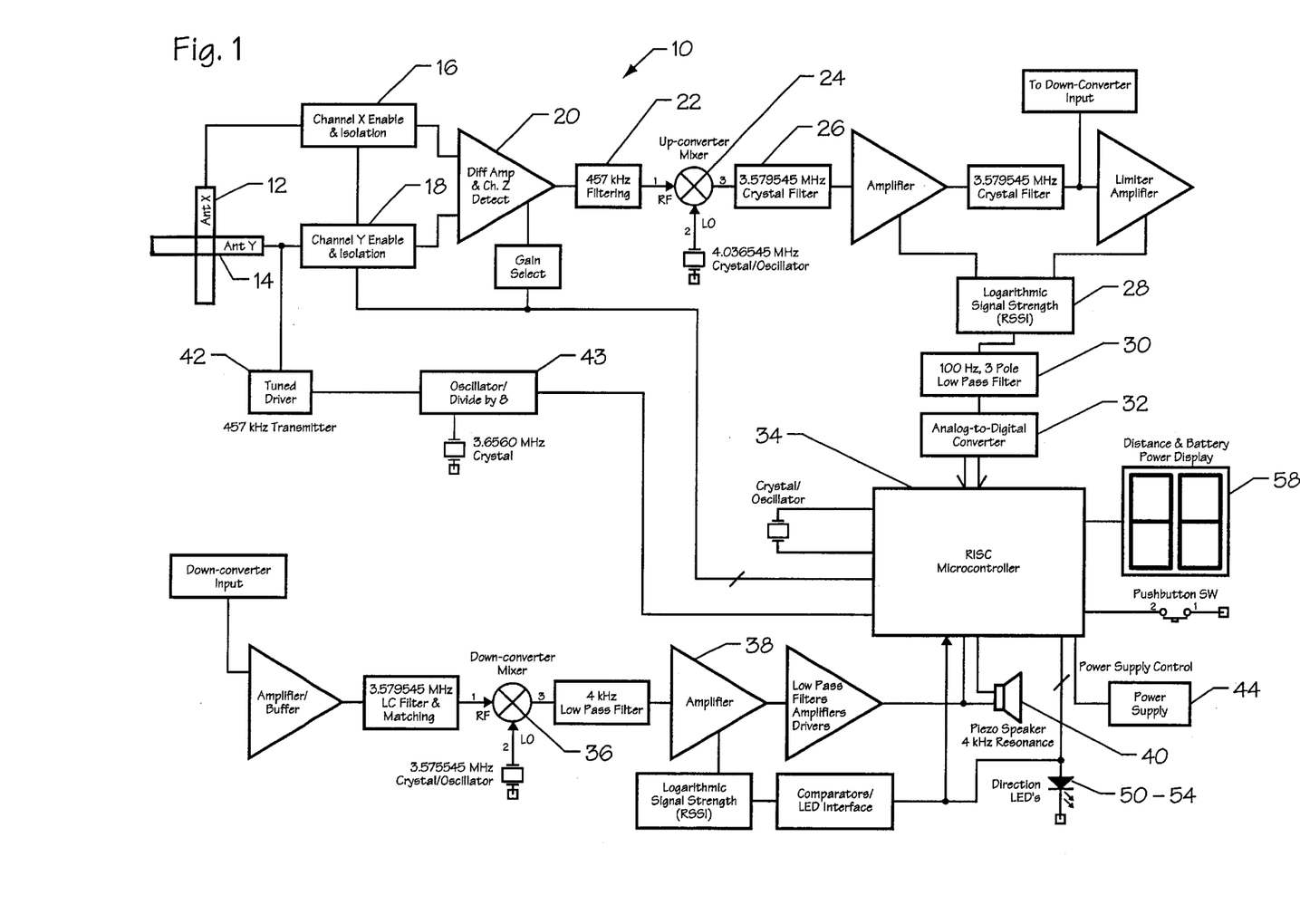
FIG. 1 is a functional block diagram illustrating an avalanche victim locating transceiving apparatus for locating buried victims by a searching survivor constructed in accordance with the present invention.
Figure 2:
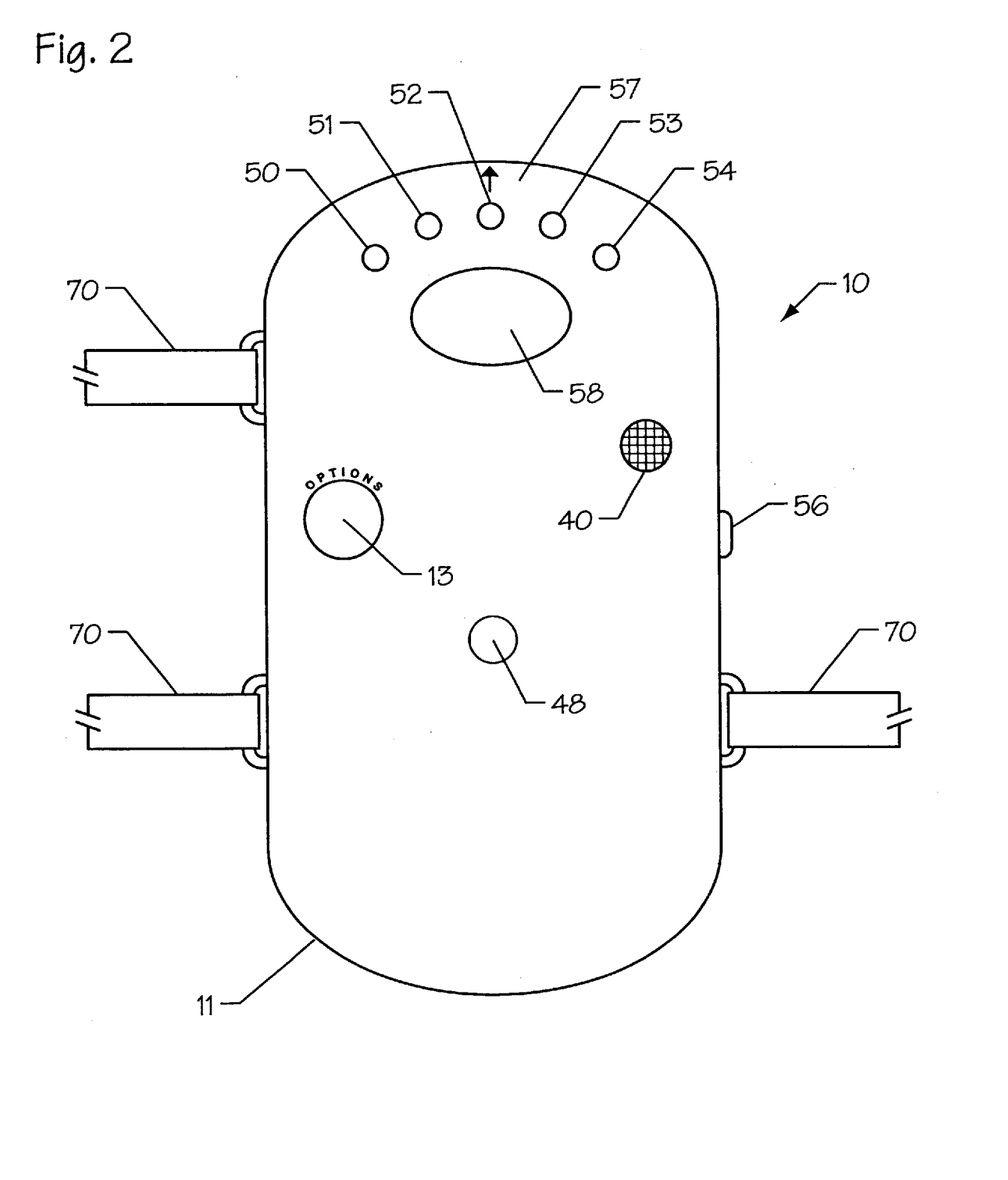
FIG. 2 is a top view illustrating a plurality of directional LED's, a distance display, a closeness LED, an OPTIONS pad, and a transmit/search pad of the avalanche victim locating transceiving apparatus for locating buried victims by a searching survivor constructed in accordance with the present invention.

As illustrated in FIG. 1, the present invention is a an avalanche victim locating transceiver apparatus, indicated generally at 10, for locating victims buried victims (not shown) carrying a transceiver apparatus 10 by a searching survivor (not shown) carrying another transceiver apparatus 10. The transceiver apparatus 10 of the present invention offers a revolutionary novel manner and approach to avalanche rescue with a transmit/search pad 48, as illustrated in FIG. 2, for control of the main features associated with the transceiver apparatus 10. A second pad, OPTIONS 13, allows interface to other unique features of the transceiver apparatus 10. As illustrated in FIG. 1, the apparatus transceiver 10 of the present invention utilizes state-of-the-art analog and digital technology combined with optimal transceiver design. As evident from the novel features described heretofore and hereafter, the transceiver apparatus 10 of the present invention decreases rescue times while allowing extremely user friendly operation.

The transceiver apparatus 10 of the present invention has a first antenna 12 mounted completely with a housing or protective enclosure 11 and a second antenna 14 also mounted completely within the protective enclosure 11. The first antenna 12 is positioned at ninety degrees from the second antenna 14. The first antenna 12 and the second antenna 14 are preferably constructed from a wire-wound ferrite material with center-tapped grounding, however, other suitable material known in the art for construction of the first antenna 12 and the second antenna 14 is within the scope of the present invention. Preferably, the first antenna 12 and the second antenna 14 have selective shielding and isolation 16, 18, respectively, by known means, including physical grounding, for improved performance and tracking capabilities of the transceiver apparatus 10. Furthermore, the first antenna 12 and the second antenna 14 are capacitively tuned to 457 kHz.

A differential front end amplifier 20 of the transceiver apparatus 10 provides a virtual third antenna 21 for the transceiver apparatus 10. The virtual third antenna 21 has a signal magnitude derived from the phase information generated by the differential front end amplifier 20. The magnitude information from the first antenna 12, the second antenna 14, and front end amplifier 20, provides for three-dimensional vector analysis during rescue operations. Actual operation of the transceiver apparatus 10 of the present invention will be discussed in further detail below.

The transceiver apparatus 10 further has a tuned amplifier 22 connected to the differential front end amplifier 20. Preferably, the tuned amplifier 22 has a ceramic filter for image rejection. Similar to the first antenna 12 and the second antenna 14, the tuned amplifier 22 is preset for 457 kHz Radio Frequency (RF). The present frequency (457 kHz) of the apparatus 10 is generally standard in the rescue industry and is the same radio frequency used by other avalanche rescue devices manufactured by other companies. By utilizing the same radio frequency as other devices, the transceiver apparatus 10 of the present invention is usable to transmit and receive signals from other transceiver avalanche rescue devices for use in rescues whereby buried victims and rescuers are using a multitude of avalanche rescue devices manufactured by other companies.

The transceiver apparatus 10 of the present invention also includes an up-conversion mixer 24 to a higher frequency. The up-conversion is achieved through standard superheterodyne receiver techniques. The 457 kHz RF output from the tuned amplifier 22 is applied to the up-conversion mixer 24. A local oscillator (LO) frequency of 4.036545 MHz is heterodyned and the difference frequency of 3.579545 MHz is used for the Intermediate Frequency (IF). In short, the up-conversion 24 allows improved Intermediate Frequency (IF) filtering.

The transceiver apparatus 10 has an efficient, crystal intermediate frequency filter 26 and uses Received-Signal-Strength-Indicator (RSSI) 28 with Low-Pass-Filtering 30 and digitizing of the RSSI 28. The RSSI is a logarithmic indication of signal strength. The signal is low-pass-filtered to reject extraneous noise, but still allows sufficient rise time to allow full processing. The output then goes to an Analog-to Digital converter (A/D) 32 for digitizing which is controlled by a microcontroller 34.

The transceiver apparatus 10 of the present unique invention includes the common microcontroller or microprocessor 34 for controlling the operation of the transceiver apparatus 10. Novel features of the microprocessor include antenna switching, Digital Signal Processing (DSP) and filtering, three-dimensional vector analyses for direction information, diagnostics, improved human interface, linearization of RSSI for distance display, automatic sensitivity adjustment, controls transmitter (timing, enabling, etc.), automatic transmit default operation, power supply control and maintenance (enabling, sleep, etc.).

The microcontroller 34 further includes multiple transmitter reception selectivity for masking of extraneous signals received by the transceiver apparatus 10 of the searching user from a multitude of buried victims wearing any transmitter. The novel multiple transmitter reception selectivity capability for selective reception when there are multiple transmitters being used such as when there are multiple buried victims is unique for the transceiver apparatus 10 of the present invention. The multiple transmitter selectivity of the present invention enables the searching user of the transceiver apparatus 10 to clearly pinpoint one buried victim in case of multiple victim burials. The microcontroller 34 masks signals outside a window (between approximately ± three (3°) degrees to ± five (5°) degrees) centered about the middle of the flux path of a receiving transceiver apparatus 10. Therefore, the multiple transmitter selectivity of the transceiving apparatus 10 of the present invention allows the searching user to focus on only one buried victim at a time thereby masking the transceiver apparatuses 10 of the other buried victims until the first buried victim is recovered. By masking the transceiver apparatuses 10 of the other buried victims, the searching user can quickly reach each buried victim in succession thereby decreasing the amount of time each victim is buried. The multiple transmitter selectivity feature is easily entered by the searching user upon depression of the OPTIONS pad interface 13, as described above and will be described in further detail below.

Preferably, the transceiver apparatus 10 of the present invention also includes down conversion 36 of Intermediate Frequency to audio frequency and further amplification 38 to give increased range. The transmitting signal direction and distance can now be inferred from the display on the directional LED's (described below) and a piezoelectric speaker 40 that has resonance at this audio frequency provides for improved selectivity.

The transceiver apparatus 10 of the present invention further includes stable, accurate, crystal referenced system for transmit and an efficient, tuned transmitter driver 42. The microcontroller 34 controls the timing and operation of an oscillator 43 that is controlled by a crystal at eight (8) times 457 kHz, or 3.6560 MHz. The output from the oscillator goes to a transistor amplifier that is tuned to 457 kHz.

The transceiver apparatus 10 of the present invention is powered by a suitable power source 44 such as batteries or the like. For increased safety, each member of a group exposed to the possibility of avalanche danger is provided with the transceiver apparatus 10 prior to entering the avalanche danger zone. Once the transceiver apparatus 10 is activated, i.e., power on, the transceiver apparatus 10 is in the transmit mode so that the signal is receivable by a searching user in case of accidental burial.

As mentioned, in operation of the transceiver apparatus 10 of the present invention, each user intending to hike, ski, snowmobile, etc. in an avalanche area will releasably secure one transceiver apparatus 10 on his or her person. Each person can releasably secure the transceiver apparatus 10 to himself/herself by placing the transceiver apparatus 10 in his/her pocket or with an included strapping system 70. As illustrated in FIG. 2, the illustrated components of the transceiver apparatus 10 of FIG. 1 are preferably housed entirely within the portable housing or protective enclosure 11 to protect the components. In the preferred embodiment, the protective enclosure 11 has a length of approximately 5.5 inches, a width of approximately 3.25 inches, a thickness of approximately one inch, and weights approximately 8.5 ounces (241 grams).

The strapping system 70 is mounted to the protective enclosure 11 such that the user can easily strap the transceiver apparatus 10 about his or her person away from radios and other chest hardware and adjust the strapping system 70 such that the transceiver apparatus 10 is snug against his or her abdomen. The unique strapping system 70 inhibits accidental dislodgment of the transceiver apparatus 10 during an avalanche or other burial event and is provided with a quick release system providing fast, simple access when initiating search while maintaining the transceiver apparatus 10 attached to the searching user during the search.

As mentioned above, the transceiver apparatus 10 normally operates in a transmit mode. In the event that one or more users are buried in an avalanche, the transceiver apparatuses 10 of each buried victim flash a transmit light 56 and continue to transmit a signal receivable by the transceiver apparatuses 10 of by each of the survivors. To operate the transceiver apparatus 10 in the search mode during location procedures for buried victims, the survivor or survivors will depress a manually operated transmit/search pad 48 on the protective enclosure 11 to activate the microprocessor 34 to the search mode. As a unique, added safety feature, the transceiver apparatus 10 of the present invention requires the searching survivor to depress the transmit/search pad 48 at present time internals, e.g., every five minutes, or the transceiver apparatus 10 will automatically revert from the search mode to the transmit mode. The unique automatic transmit feature of the transceiver device 10 provides victim-searching survivor transmit capabilities in case the survivor himself/herself becomes a buried victim of a secondary avalanche while searching for the first buried victims and is not able to manually activate the transceiver apparatus 10 to a transmit mode. In a preferred embodiment, prior to expiration of the present time interval, an alarm on the transceiver apparatus 10 activates to warn the searching survivor to depress the transmit/search pad 48 to remain in the search mode. By depressing the transmit/search pad 48 at the sound of the alarm, the preset time interval will be reset such that the transceiver apparatus 10 will remain in the search mode for an additional preset time interval upon which the transceiver apparatus 10 will revert back to the transmit mode.

To ease in location of the transceiver apparatus 10 of the buried victims, the transceiver apparatus 10 of the present invention further includes a plurality of directional light emitting diodes (LED's) 50, 51, 52, 53, 54 across one end of the transceiver apparatus 10, as illustrated in FIG. 2. The directional LED's 50–54 indicate the direction of the transmitting flux lines from the transmitting transceiver apparatus 10 providing a path to the transceiver apparatus 10 of the buried victim. For instance, when the directional LED 50 is illuminated, it is an indication that the buried victim is in a direction generally toward the left of the searching survivor. When the directional LED 54 is illuminated, it is an indication that the buried victim is in a direction generally toward the right of the searching survivor. Then, when the direction LED 52 is lit, adjacent the arrow indicator 57, it indicates that the buried victim is generally directly ahead or behind the searching survivor and the searching survivor can proceed in the correct direction of the buried victim without having to coordinate complicated "tangent search" commonly used by prior art devices. In fact, with the transceiver apparatus 10 of the present invention, no secondary "grid search" is required to pinpoint the buried victim at close range.

Furthermore, the transceiver apparatus 10 of the present invention includes a dual digit LED display 58 on the protective enclosure 11 for displaying information including, but not limited to, distance information between the buried transceiver apparatus 10 of the buried victim to the searching transceiver apparatus 10 of the searching user. During the search, regardless of which directional LED 50–54 is lit, the transceiver apparatus 10 of the searching survivor will have information as to the distance of the transceiver apparatus 10 of the buried victim from the transceiver apparatus 10 of the searching survivor user. Distance information displayed on the distance display 58 of the transceiver apparatus 10 of the present invention of the searching survivor assists the searching survivor in quickly locating and rescuing the buried victim thereby increasing the likelihood that the buried victim can be recovered prior to serious injury or death.

While the transceiver apparatus 10 is in the transmit mode, an LED 56 flashes to indicate that the transceiver apparatus 10 is operational. Also, the transceiver apparatus 10 includes a speaker 40 which beeps coincident with the transmission in the transmit mode and which projects the alarm when the transceiver apparatus 10 is about to revert back to the transmit mode from the search mode, as described above. During searching mode, the transceiver apparatus 10 will also emit a sound from the speaker 40. When the searching user is within a predetermined range, e.g., three (3 m) meters, of the buried victim, the pitch of the sound from the speaker 40 will change indicating the closeness of the searching user to the buried victim.

Furthermore, the transceiver apparatus 10 includes the OPTIONS pad interface 13 on the protective enclosure 13 for performing various functions related to the operation of the transceiver apparatus 10. For instance, depressing the OPTIONS pad interface 13 for a predetermined time period allows the speaker to be muted. The OPTIONS pad interface 13 further allows the user to convert the transceiver apparatus 10 into the multiple transmitter selectivity mode, as discussed above, and allows the remaining battery power to be displayed on the display 58, if desired.

It should be noted that it is within the scope of the present invention that the directional LED's and the distance display to be constructed of a liquid crystal display (LCD) rather than an LED.

In sum, the transceiving apparatus 10 of the present invention digitizes the signal from the transceiving apparatus 10 of the buried victim and determines the distance and direction of the buried victim. The rescuer is then led directly to the buried victim's transceiver apparatus 10. The directional LED's 50–54 on the transceiving apparatus 10 indicate the direction of travel and the distance display 58 on the transceiver apparatus 10 provides the distance to the buried victim. The transceiving apparatus 10 of the present invention virtually eliminates convoluted search patterns, earphones, and volume/sensitivity controls commonly necessary in the prior art searching devices.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

We claim:

1. An apparatus for use in rescue operations, the apparatus comprising:
    a housing;
    a receiver, located within said housing, that includes an antenna which is capable of receiving a radio signal having a predetermined frequency;
    a processor, located within said housing, that is capable of using information derived only from a radio signal received by said antenna to determine a distance to travel to get from said housing to a source of the radio signal; and
    an interface, operatively attached to said housing, that includes a display which is capable of receiving a distance signal from said processor and providing a user with a numeric, visual indication of a distance to travel to get from said housing to a source of the radio signal;
    wherein the apparatus has dimensions and a weight that allow the apparatus to be attached to and carried by a user.

2. An apparatus, as claimed in claim 1, wherein:
    said receiver includes a received signal strength indicator (RSSI) for receiving a signal and producing a logarithmic signal that is indicative of the strength of said signal.

3. An apparatus, as claimed in claim 2, wherein:
    said receiver includes an analog-to-digital converter for receiving said logarithmic signal and producing a digital signal that is representative of said logarithmic signal.

4. An apparatus, as claimed in claim 2, wherein:

said processor is capable of receiving said digital signal, linearizing said digital strength signal, and producing a linearized digital signal.

5. An apparatus, as claimed in claim 1, wherein:

said display includes a direction indicator for providing an indication of the direction of the flux lines associated with a radio signal relative to said housing.

6. An apparatus, as claimed in claim 1, wherein:

said display is capable of providing an indication of battery power.

7. An apparatus, as claimed in claim 1, wherein:

said receiver includes another antenna;

said display includes a direction indicator; and said housing has a length of no greater than about 5.5 inches, a width of no greater than about 3.25 inches, and a thickness of no greater than about 1 inch.

8. An apparatus for use in rescue operations, the apparatus comprising:

a housing;

a receiver, located within said housing, that includes a first antenna and a second antenna that are each capable of receiving a radio signal having a predetermined frequency, said receiver not include a third antenna that is capable of receiving a radio signal having said predetermined frequency;

a processor, located within said housing, that is capable of using information derived from a radio signal received by said first and second antennas to determine a direction of a flux line associated with a source of the radio signal relative to said housing; and an interface, operatively attached to said housing, that includes a display for providing a user with a visual indication of the direction of the flux line associated with the source of the radio signal relative to said housing;

wherein the apparatus has dimensions and a weight that allow the apparatus to be attached to and carried by a user.

9. An apparatus, as claimed in claim 8, wherein:

said first antenna is substantially orthogonal to said second antenna.

10. An apparatus, as claimed in claim 9, wherein:

said receiver includes a differential amplifier for receiving a first signal from said first antenna, a second signal from said second antenna, and producing a third signal that is representative of a difference in the magnitudes of said first and second signals.

11. An apparatus, as claimed in claim 8, wherein:

said display is capable of providing a user with a numeric, visual indication of a distance to travel to get from said housing a source of the radio signal.

12. An apparatus, as claimed in claim 11, wherein:

said receiver includes a received signal strength indicator (RSSI) for receiving a signal and producing a logarithmic signal that is indicative of the strength of said signal;

said receiver includes an analog-to-digital converter for receiving said logarithmic signal and producing a digital signal that is representative of said logarithmic signal; and said processor is capable of receiving said digital signal, linearizing said digital signal, and producing a linearized digital signal.

13. An apparatus, as claimed in claim 8, wherein:

said display is capable of providing an indication of battery power.

14. An apparatus, as claimed in claim 8, wherein:

said housing has a length of no greater than about 5.5 inches, a width of no greater than about 3.25 inches, and a thickness of no greater than about 1 inch.

15. An apparatus for use in rescue operations, the apparatus comprising:

a housing;

a receiver, located within said housing, that includes a first antenna and a second antenna that are each capable of receiving a radio signal having a predetermined frequency;

processor, located within said housing, that is capable of using information derived only from a radio signal received by said first and second antennas to determine a distance to travel to get from said housing to a source of the radio signal and capable of using information derived from a radio signal received by said first and second antennas to determine a direction of a flux line associated with a source of the radio signal relative to said housing; and an interface, operatively attached to said housing, that includes a display for providing a user with a visual indication of: (a) the direction of a flux line associated with a source of the radio signal relative to said housing, and (b) a distance to travel to get from said housing to a source of the radio signal;

wherein the apparatus has dimensions and a weight that allow the apparatus to be attached to and carried by a user.

16. An apparatus, as claimed in claim 15, wherein:

said first antenna is substantially orthogonal to said second antenna.

17. An apparatus, as claimed in claim 15, wherein:

said receiver includes a received signal strength indicator (RSSI) for receiving a signal and producing a logarithmic signal that is indicative of the strength of said signal;

said receiver includes an analog-to-digital converter for receiving said logarithmic signal and producing a digital signal that is representative of said logarithmic signal; and said processor is capable of receiving said digital signal, linearizing said digital signal, and producing a linearized digital signal.

18. An apparatus, as claimed in claim 15, wherein:

said display is capable of providing an indication of battery power.

19. An apparatus, as claimed in claim 15, wherein:

said housing has a length of no greater than about 5.5 inches, a width of no greater than about 3.25 inches, and a thickness of no greater than about one inch.

20. An apparatus for use in rescue operations, the apparatus comprising:

a housing;

a receiver, located within said housing, that includes an antenna which is capable of receiving a radio signal having a predetermined frequency;

wherein said receiver includes a differential amplifier for receiving a signal related to a radio signal provided by said antenna;

wherein said receiver includes a received signal strength indicator (RSSI) for receiving a signal derived from a radio signal that has been processed by said antenna and then processed by said differential amplifier and producing a logarithmic signal that is indicative of the strength of said signal;

wherein said receiver includes an analog-to-digital converter for receiving a signal related to said logarithmic signal and producing a digital signal that is representative of said signal related to said logarithmic signal;

a processor, located within said housing, that is capable of using information derived from a radio signal received by said antenna to determine at least one of the following: (a) a direction of the radio signal relative to said housing, and (b) a distance to travel to get from said housing to a source of the radio signal; and an interface, operatively attached to said housing, that includes a display which is capable of providing a user with at least one of the following: (a) a direction of the radio signal relative to said housing, and (b) a distance to travel to get from said housing to a source of the radio signal;

wherein the apparatus has dimensions and a weight that allow the apparatus to be attached to and carried by a user.

* * * * *

UNITED STATES PATENT AND TRADEMARK OFFICE
CERTIFICATE OF CORRECTION

PATENT NO.     : 6,484,021 B1
DATED          : November 19, 2002
INVENTOR(S)    : John W. Hereford and Michael X. Bond

It is certified that error appears in the above-identified patent and that said Letters Patent is hereby corrected as shown below:

<u>Column 9,</u>
Line 1, delete "claim 2", and insert -- claim 3 --;
Line 24, delete "receiver not", and insert -- receiver does not --; and <u>Column 10,</u>
Line 15, before "processor", insert -- a --.

Signed and Sealed this

Third Day of June, 2003

JAMES E. ROGAN
*Director of the United States Patent and Trademark Office*